US012206955B2

(12) United States Patent
Cao

(10) Patent No.: US 12,206,955 B2
(45) Date of Patent: Jan. 21, 2025

(54) MULTIMEDIA DATA GENERATING METHOD, APPARATUS, ELECTRONIC DEVICE, MEDIUM, AND PROGRAM PRODUCT

(71) Applicant: Beijing Zitiao Network Technology Co., Ltd., Beijing (CN)

(72) Inventor: Jiajin Cao, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/538,703

(22) Filed: Dec. 13, 2023

(65) Prior Publication Data
US 2024/0114215 A1   Apr. 4, 2024

Related U.S. Application Data

(63) Continuation of application No. PCT/CN2022/127840, filed on Oct. 27, 2022.

(30) Foreign Application Priority Data

Oct. 28, 2021   (CN) .......................... 202111266196.5

(51) Int. Cl.
*H04N 21/85*   (2011.01)
*G10L 13/02*   (2013.01)
(Continued)

(52) U.S. Cl.
CPC ......... *H04N 21/8106* (2013.01); *G10L 13/02* (2013.01); *H04N 21/4884* (2013.01)

(58) Field of Classification Search
CPC ........ G10L 13/02; H04N 21/85; H04N 21/84; H04N 21/4884; H04N 21/4888
(Continued)

(56) References Cited

U.S. PATENT DOCUMENTS 8,744,239 B2 * 6/2014 Rodriguez ............. G11B 27/34
386/241
2008/0002949 A1 * 1/2008 Tokunaka ............... G11B 27/34
386/338

(Continued)

FOREIGN PATENT DOCUMENTS

CN   105959773 A   9/2016
CN   107230397 A   10/2017
(Continued)

OTHER PUBLICATIONS

ISA China National Intellectual Property Administration, International Search Report Issued in Application No. PCT/CN2022/127840, Jan. 6, 2023, WIPO, 4 pages.
(Continued)

*Primary Examiner* — Daquan Zhao
(74) *Attorney, Agent, or Firm* — Alleman Hall & Tuttle LLP

(57) ABSTRACT

Disclosed are a multimedia data generating method, apparatus, electronic device, medium, and program product, applied to the field of multimedia data processing technologies. The method includes: receiving text information inputted by a user; displaying, in response to a recording trigger operation for the text information, the text information and acquiring a first reading speech of the text information; and generating a first multimedia data based on the text information and the first reading speech and displaying the first multimedia data; the first multimedia data includes the first reading speech and a video image matched with the text information; the first multimedia data includes a plurality of first multimedia segments; the plurality of first multimedia segments correspond to a plurality of text segments included in the text information, respectively. The disclose may improve quality of multimedia data generation.

18 Claims, 7 Drawing Sheets

(51) Int. Cl.
*H04N 21/488* (2011.01)
*H04N 21/81* (2011.01)
*H04N 21/84* (2011.01)

(58) Field of Classification Search
USPC ............... 386/239, 240, 241, 245, 247, 248
See application file for complete search history.

(56) References Cited

U.S. PATENT DOCUMENTS

| | | |
|---|---|---|
| 2008/0167875 A1 | 7/2008 | Bakis et al. |
| 2021/0082394 A1 | 3/2021 | Huang et al. |
| 2021/0142783 A1 | 5/2021 | Kim et al. |
| 2023/0122824 A1* | 4/2023 | Narayanan .............. G10L 13/08 704/200 |

FOREIGN PATENT DOCUMENTS

| | | | |
|---|---|---|---|
| CN | 110933330 A | 3/2020 | |
| CN | 111212323 A | 5/2020 | |
| CN | 111669620 A | 9/2020 | |
| CN | 111681679 A | 9/2020 | |
| CN | 112509609 A | 3/2021 | |
| CN | 112954390 A | 6/2021 | |
| CN | 113518160 A | 10/2021 | |

OTHER PUBLICATIONS

First Office Action for Chinese Patent Application No. 202111266196.5, mailed on Oct. 22, 2024, 17 pages.
European Patent Office, Extended European Search Report Issued in Application No. 22886047.4, Aug. 6, 2024, 11 pages.

\* cited by examiner

MULTIMEDIA DATA GENERATING METHOD, APPARATUS, ELECTRONIC DEVICE, MEDIUM, AND PROGRAM PRODUCT

CROSS-REFERENCE TO RELATED APPLICATION(S)

This application is a Continuation Application of International Patent Application No. PCT/CN2022/127840, filed Oct. 27, 2022, which claims priority to Chinese Patent Application No. 202111266196.5, titled "Multimedia Data Generating Method, Apparatus, Electronic Device, Medium, and Program Product", filed Oct. 28, 2021, the disclosures of which are incorporated herein by reference in their entities.

FIELD

Embodiments of the disclosure generally relate to data processing, and more particularly relate to a multimedia data generating method, apparatus, electronic device, medium, and program product.

BACKGROUND

With internet advancement, more and more users share content with other users by making videos. In relevant technologies, video data may be generated based on a user-edited text. For example, the text may be directly converted into speech by machine, and then video data are generated based on the speech. However, videos generated by such technologies have a poor quality.

SUMMARY

To solve or at least solve the above technical solutions, embodiments of the disclosure provide a multimedia data generating method, apparatus, electronic device, medium, and program products.

According to a first aspect of the disclosure, there is provided a multimedia data generating method, comprising:
receiving text information inputted by a user;
displaying, in response to a recording trigger operation for the text information, the text information and acquiring a first reading speech of the text information; and
generating a first multimedia data based on the text information and the first reading speech and displaying the first multimedia data;
wherein the first multimedia data comprise the first reading speech and a video image matched with the text information, the first multimedia data comprise a plurality of first multimedia segments, the plurality of first multimedia segments corresponding to a plurality of text segments included in the text information, respectively; wherein a first target multimedia segment comprises a first target video segment and a first target speech segment, the first target multimedia segment referring to a first multimedia segment in the plurality of first multimedia segments corresponding to a first target text segment in the plurality of text segments, the first target video segment including a video image matched with the first target text segment, the first target speech segment including a reading speech of the first target text segment.
Optionally, the method further comprises:
converting the text information into speech data in response to a multimedia synthesis operation; and
generating second multimedia data based on the text information and the speech data, and displaying the second multimedia data.
wherein the second multimedia data comprise speech data and the video image matched with the text information; the second multimedia data comprise a plurality of second multimedia segments, the plurality of second multimedia segments corresponding to a plurality of text segments included in the text information, respectively; a second target multimedia segment comprises a second target video segment and a second target speech segment, the second target multimedia segment referring to a second multimedia segment in the plurality of second multimedia segments corresponding to a second target text segment in the plurality of text segments, the second target video segment including a video image matched with the second target text segment, the second target speech segment including a reading speech of the second target text segment.
Optionally, the method further comprises:
displaying, in response to a recording trigger operation after the second multimedia data are generated, the text information, and acquiring a second reading speech of the text information; and
generating a third multimedia data based on the text information and the second reading speech, and displaying the third multimedia data to overwrite the second multimedia data;
wherein the third multimedia data comprise the second reading speech and the video image matched with the text information; the third multimedia data comprise a plurality of third multimedia segments, the plurality of third multimedia segments corresponding to a plurality of text segments included in the text information, respectively; a third target multimedia segment includes a third target video segment and a third target speech segment, the third target multimedia segment referring to a third multimedia segment in the plurality of third multimedia segments corresponding to a third target segment in the plurality of text segments, the third target video segment including a video image matched with the third target text segment, and the third target speech segment including a reading speech of the third target text segment.
Optionally, the method further comprises:
deleting, in response to a rerecording operation on the first target speech segment, the first target speech segment;
displaying the first target text segment corresponding to the first target speech segment, and acquiring a read segment of the first target text segment; and
displaying the read segment in an area corresponding to the first target speech segment.
Optionally, the method further comprises:
marking, in a case of detecting that a match rate between the first target speech segment and the first target text segment is lower than a match rate threshold while acquiring the first reading speech, the first target speech segment and the first target text segment.
Optionally, the method further comprises:
moving, in response to a speech segment sliding operation and sliding of a first cursor pointing to the first reading speech till the first target speech segment, a second cursor pointing to the text information till the first target text segment.
Optionally, the method further comprises:
prominently displaying a text segment currently read by the user while acquiring the first reading speech.

Optionally, the method further comprises:
editing, after the first multimedia data are generated and displayed, the text information in response to an edit operation for the text information to obtain a modified target text information;
displaying, in response to a recording trigger operation for the target text information, the target text information and acquiring a target reading speech of the target text information.
updating the first reading speech based on the target reading speech to obtain a third reading speech;
generating a fourth multimedia data based on the target text information and the third reading speech, and displaying the fourth multimedia data;
wherein the fourth multimedia data comprise the third reading speech and the video image matched with the text information; the fourth multimedia data comprise a plurality of fourth multimedia segments, the plurality of fourth multimedia segments corresponding to a plurality of text segments included in the text information, respectively; a fourth target multimedia segment comprises a fourth target video segment and a fourth target speech segment, the fourth target multimedia segment referring to a fourth multimedia segment in the plurality of fourth multimedia segments corresponding to a fourth target text segment in the plurality of text segments, the fourth target video segment including the video image matched with the fourth target text segment, the fourth target speech segment including the reading speech of the fourth target text segment.

Optionally, the method further comprises:
subjecting, after acquiring the first reading speech, the first reading speech to voice change processing and/or speed change processing to obtain a fourth reading speech;
wherein the generating a first multimedia data based on the text information and the first reading speech and displaying the first multimedia data comprises:
generating the first multimedia data based on the text information and the fourth reading speech, and displaying the first multimedia data.

According to a second aspect of the disclosure, there is provided a multimedia data generating apparatus, comprising:
a text information receiving module, configured to receive text information inputted by a user;
a first reading speech acquiring module, configured to display, in response to a recording trigger operation for the text information, the text information and acquire a first reading speech of the text information; and
a first multimedia data generating module, configured to generate first multimedia data based on the text information and the first reading speech, and display the first multimedia data;
wherein the first multimedia data comprise the first reading speech and a video image matched with the text information, the first multimedia data comprise a plurality of first multimedia segments, the plurality of first multimedia segments corresponding to a plurality of text segments included in the text information, respectively; wherein a first target multimedia segment comprises a first target video segment and a first target speech segment, the first target multimedia segment referring to a first multimedia segment in the plurality of first multimedia segments corresponding to a first target text segment in the plurality of text segments, the first target video segment including a video image matched with the first target text segment, the first target speech segment including a reading speech of the first target text segment.

Optionally, the apparatus further comprises:
a speech data converting module, configured to convert the text information into speech data response to a multimedia synthesis operation;
a second multimedia data generating module, configured to generate second multimedia data based on the text information and the speech data and display the second multimedia data;
wherein the second multimedia data comprise speech data and a video image matched with the text information; the second multimedia data comprise a plurality of second multimedia segments, the plurality of second multimedia segments corresponding to a plurality of text segments included in the text information, respectively; a second target multimedia segment comprises a second target video segment and a second target speech segment, the second target multimedia segment referring to a second multimedia segment in the plurality of second multimedia segments corresponding to a second target text segment in the plurality of text segments, the second target video segment including a video image matched with the second target text segment, the second target speech segment including a reading speech of the second target text segment.

Optionally, the apparatus further comprises:
a second reading speech acquiring module, configured to display, in response to a recording trigger operation after the second multimedia data are generated, the text information, and acquire a second reading speech of the text information; and
a third multimedia data generating module, configured to generate a third multimedia data based on the text information and the second reading speech, and display the third multimedia data to overwrite the second multimedia data;
wherein the third multimedia data comprise the second reading speech and a video image matched with the text information; the third multimedia data comprise a plurality of third multimedia segments, the plurality of third multimedia segments corresponding to a plurality of text segments included in the text information, respectively; a third target multimedia segment includes a third target video segment and a third target speech segment, the third target multimedia segment referring to a third multimedia segment in the plurality of third multimedia segments corresponding to a third target segment in the plurality of text segments, the third target video segment including a video image matched with the third target text segment, and the third target speech segment including a reading speech of the third target text segment.

Optionally, the apparatus further comprises:
a speech segment rerecording module, configured to delete, in response to a rerecording operation on the first target speech segment, the first target speech segment, display the first target text segment corresponding to the first target speech segment, acquire a read segment of the first target text segment, and display the read segment in an area corresponding to the first target speech segment.

Optionally, the apparatus further comprises:
a mistake marking module, configured to mark, in a case of detecting that a match rate between the first target speech segment and the first target text segment is lower than a match rate threshold while acquiring the first reading speech, the first target speech segment and the first target text segment.

Optionally, the apparatus further comprises:
a speech segment sliding module, configured to move, in response to a speech segment sliding operation and sliding of a first cursor pointing to the first reading speech till the first target speech segment, a second cursor pointing to the text information till the first target text segment.

Optionally, the apparatus further comprises:
a text segment prominently-displaying module, configured to prominently display a currently read text segment while acquiring a first reading speech.

Optionally, the apparatus further comprises:
a text information modifying module, configured to edit, after the first multimedia data are generated and displayed, the text information in response to an edit operation for the text information to obtain a modified target text information;
a target reading speech acquiring module, configured to display, in response to a recording trigger operation for the target text information, the target text information and acquire a target reading speech of the target text information.
a third reading speech generating module, configured to update the first reading speech based on the target reading speech to obtain a third reading speech;
a fourth multimedia data generating module, configured to generate a fourth multimedia data based on the target text information and the third reading speech, and display the fourth multimedia data;
the fourth multimedia data comprise the third reading speech and the video image matched with the text information; the fourth multimedia data comprise a plurality of fourth multimedia segments, the plurality of fourth multimedia segments corresponding to a plurality of text segments included in the text information, respectively; a fourth target multimedia segment comprises a fourth target video segment and a fourth target speech segment, the fourth target multimedia segment referring to a fourth multimedia segment in the plurality of fourth multimedia segments corresponding to a fourth target text segment in the plurality of text segments, the fourth target video segment including the video image matched with the fourth target text segment, the fourth target speech segment including the reading speech of the fourth target text segment.

Optionally, the apparatus further comprises:
a speech processing module, configured to subject, after the first reading speech is acquired, the first reading speech to voice change processing and/or speed change processing to obtain a fourth reading speech;
a first multimedia data generating module, configured to generate the first multimedia data based on the text information and the fourth reading speech, and display the first multimedia data.

According to a third aspect of the disclosure, there is provided an electronic device, comprising: a processor configured to execute a program stored in a memory, wherein the computer program, when being executed by the processor, performs the method according to the first aspect.

According to a fourth aspect of the disclosure, there is provided a computer-readable storage medium on which a computer program is stored, wherein the computer program, when being executed by a processor, performs steps of the method according to the first aspect.

According to a fifth aspect of the disclosure, there is provided a computer program product, wherein the computer program, when running on a computer, causes the computer to perform steps of the method according to the first aspect.

The technical solution provided by embodiments of the disclosure offer the following advantages over conventional technologies:

After the user inputs the text information, the user may be provided with a recording entry, via which the user may execute the recording trigger operation. In response to the recording trigger operation, text information may be displayed for the user to read, and a first reading speech is acquired while the user is reading the text information. The first multimedia data may be generated based on the text information and the first reading speech and then displayed. The first multimedia data comprise the first reading speech and a video image matched with the text information; the first multimedia data comprise first multimedia segments corresponding to the plurality of text segments in the text information, respectively. The disclosure may record the first reading speech manually; compared with the speech converted by machine from the text information, the manually recorded first reading speech is more emotional, so that the generated first multimedia data has a higher quality with a better user viewing experience. Moreover, the first multimedia data are displayed with a plurality of first multimedia segments, so that the user may intuitively know the correspondence relationship between the text segment and the video image in the first multimedia segment, which enables modification to individual multimedia segments, thereby enhancing video making efficiency and user experience.

BRIEF DESCRIPTION OF THE DRAWINGS

The accompanying drawings are intended to provide further understanding of the disclosure, which constitute a part of the specification and serve to explain the disclosure together with the embodiments of the disclosure, not intended to limit the disclosure. Among the drawings.

DETAILED DESCRIPTION OF EMBODIMENTS

To better understand the above and other objectives, features and advantages of the disclosure, the solution of the disclosure will be further described infra. It is noted that without conflicts, the embodiments of the disclosure and the features in the embodiments may be combined with each other.

Many details will be illustrated in the description below for thorough understanding of the disclosure, but the disclosure may also be implemented by other manners than what are described herein; apparently, the embodiments provided herein are only part of the embodiments of the disclosure, not all of them.

Figure 1:
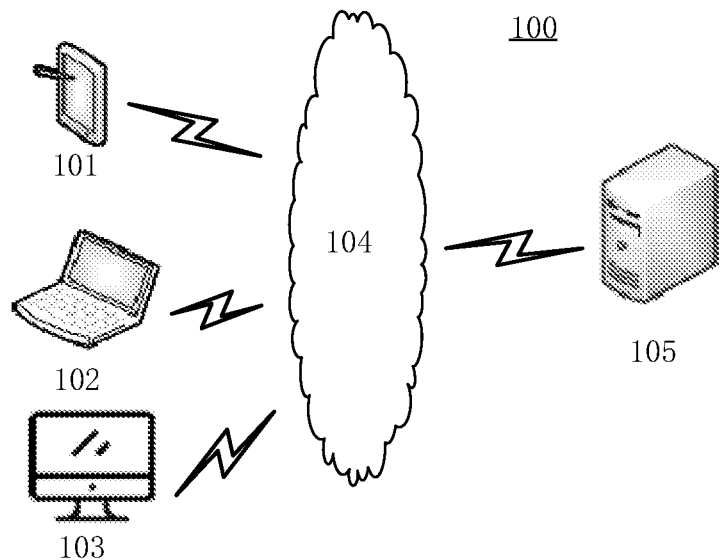
FIG. 1 is a system architecture schematic diagram of an exemplary application environment of a multimedia data generating method applicable to embodiments of the disclosure.

FIG. 1 is a schematic diagram of system architecture of an exemplary application environment of a multimedia data generating method applicable to embodiments of the disclosure.

As illustrated in FIG. 1, system architecture 100 may comprise one or more of a terminal device 101, a terminal device 102, and a terminal device 103; a network 104; and a server 105. The network 104 is configured as a medium providing a communication link between the terminal device 101, the terminal device 102, the terminal device 103, and the server 105. The network 104 may have various connection types, e.g., via wired, wireless communication link, or optical fiber cable, etc. The terminal device 102, the terminal device 102, and the terminal device 103 may be various types of electronic devices, including, but are not limited to, a desktop computer, a portable computer, a smart phone, and a tablet computer. It is to be understood that the numbers of terminal devices, networks, and servers in FIG. 1 are only schematic. Dependent on actual needs, any number of terminal devices, networks, and servers may be present. For example, the server 105 may be a server cluster comprised of a plurality of servers.

The multimedia data generating method provided according to embodiments of the disclosure is generally executed by an application installed in the terminal device 101, terminal device 102, or terminal device 103. Correspondingly, the multimedia data generating apparatus may be set in the terminal device 101, terminal device 102, or terminal device 103. For example, a user may input text information and execute a recording operation in the application installed in the terminal device 101, terminal device 102, or terminal device 103. The application may display the text information for the user to read. When the user reads the text information, the application may acquire a first reading speech. The application uploads the text information and first speech data to the server 105, so that the server 105 may obtain a video image matched with the text information from a locally stored image library based on the text information, synthesize the video image and the first reading speech to obtain first multimedia data, and return the first multimedia data to the application where the first multimedia data is displayed. With the user's own recording, the generated first multimedia data is more emotional; this improves quality of the first multimedia data and enhances viewing experience of users.

Figure 2:
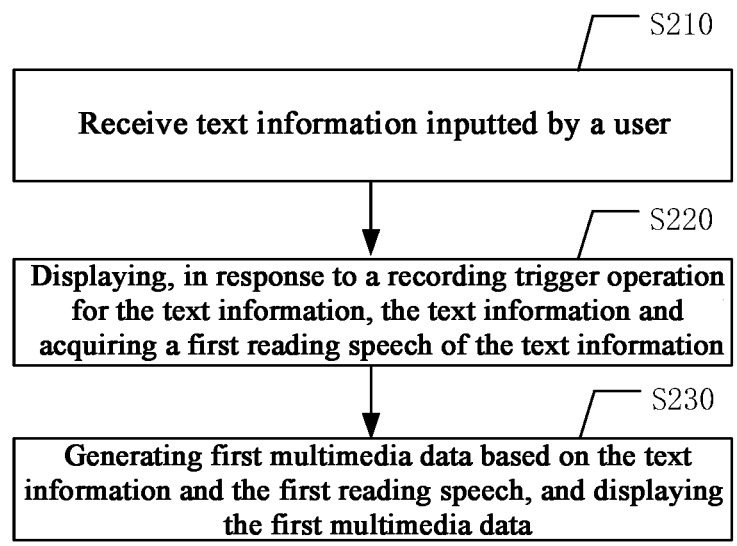
FIG. 2 is a flow diagram of a multimedia data generating method in embodiments of the disclosure.

Refer to FIG. 2, which is a flow diagram of a multimedia data generating method in embodiments of the disclosure, the multimedia data generating method being applied to an application installed in a terminal device; the multimedia data generating method may comprise steps of:

S210: receiving text information inputted by a user.

In embodiments of the disclosure, a text input interface for a user to edit a text may be provided. The user may customize the text information to edit, or paste an authorized link to extract text information from the link, dependent on needs of video making. Video making generally has a duration limit, and correspondingly, the text information has a character limit, e.g., not exceeding 2,000 characters, etc. Therefore, while the user is inputting the text information, it may be checked whether the number of characters has exceeded the limit; in a case of exceeding, a Character Limit Exceeded Window may be popped up to alert the user.

Figure 3:
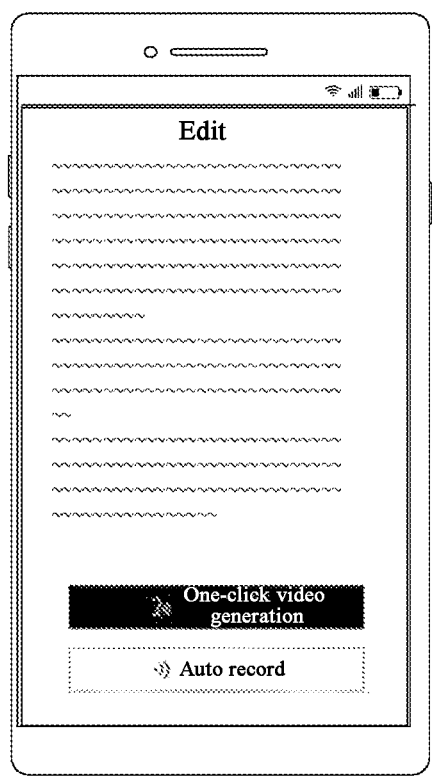
FIG. 3 is a schematic diagram of a text input interface in embodiments of the disclosure.

Refer to FIG. 3, which is a schematic diagram of a text input interface in embodiments of the disclosure, illustrating a text input interface, a one-click video generation button, and an auto record button. The user may edit text information in the text input interface. The one-click video generation button and the auto record button are different multimedia data generating manners, which will be described in detail infra.

Step S220: displaying, in response to a recording trigger operation for the text information, the text information and acquiring a first reading speech of the text information.

In embodiments of the disclosure, an entry available for the user to perform autonomous recording is provided, via which the user may produce a video dubbed by himself/herself. For example, the "auto record" button shown in FIG. 3 is the entry for autonomous recording. The user may click the "auto record" button to execute a recording trigger operation.

Optionally, after the user executes the recording trigger operation, the text information may be directly displayed in the application. The user performs reading based on the displayed text information, so that the application may acquire a first record speech of the text information. Or, upon the user's execution of the recording trigger operation, the recording interface may be first accessed, so that after the user further executes the trigger operation in the recording interface, the first reading speech of the text information is acquired.

Figure 4:
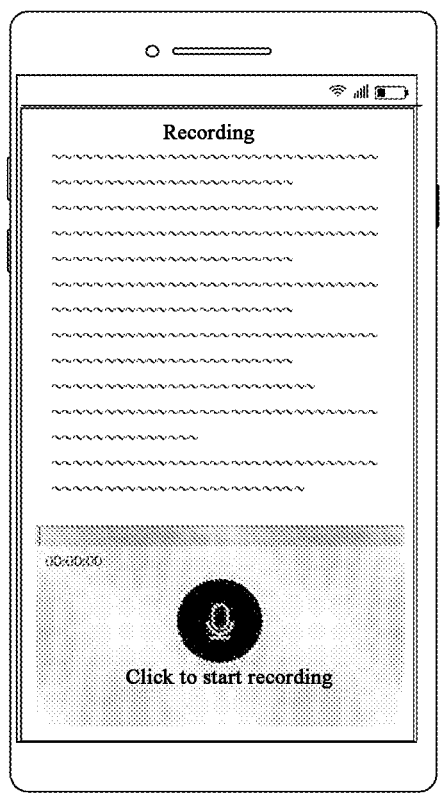
FIG. 4 is a schematic diagram of a recording interface in embodiments of the disclosure.

Refer to FIG. 4, which is a schematic diagram of a recording interface in embodiments of the disclosure. The upper half part of the recording interface is a text display area, and the lower half part of the text display area comprises a record button. The text display area displays text information, which facilitates the user to record based on the text information. When the user first accesses the recording interface, a guide bubble may be shown to guide the user to record. For example, the guide bubble may display "click the button below to start recording, and the caption will automatically scroll with your reading"; the guide bubble may automatically disappear after 5 seconds.

Upon the user's execution of the trigger operation (e.g., click operation) on the record button, the recording function is activated, and the record button turns into a recording state; by clicking the record button again, the recording may stop; and by further clicking the record button, the recording may continue. In the recording state, the user may read the text information; during the recording process, the user may suspend recording as needed. After the user finishes reading, he/she may click the finish button to obtain the first reading speech.

Step S230: generating first multimedia data based on the text information and the first reading speech, and displaying the first multimedia data.

After the first reading speech is recorded, the application may send the first reading speech and the text information to a server corresponding to the application. The server may select a video image matched with the text information from a locally stored image library. The video image and the first reading speech are synthesized, whereby first multimedia data may be obtained and displayed in the application. In case of video generation failure, a popup window may be displayed to alert, "Video generation fails; please retry"; then, the user may click the retry button to regenerate the multimedia data.

It is noted that the text information may be split into a plurality of different text segments. For each text segment, an image matched with the text segment may be selected. Therefore, a plurality of video images may be present. The more video images, the richer the content of the generated first multimedia data, and the better effect. Or, the user may select a video image locally, and the application uploads the video image and the first reading speech together to the server. The server directly synthesizes the first multimedia data based on the video image and the first reading speech. During the synthesizing process, the video image may be aligned to the first reading speech so to as enhance quality of the first multimedia data.

The first multimedia data comprise the first reading speech and a video image matched with the text information, i.e., the first multimedia data is data including a speech and an image; the first multimedia data may be video data. As noted supra, the text information may comprise a plurality of text segments. Therefore, the first multimedia data comprise a plurality of first multimedia segments, the plurality of first multimedia segments correspond to the plurality of text segments included in the text information, respectively.

Correspondingly, a first target multimedia segment includes a first target video segment and a first target speech segment. The first target multimedia segment refers to a first multimedia segment in a plurality of first multimedia segments corresponding a first target text segment in the plurality of text segments. The first target video segment comprises a reading speech of the first target text segment. The first target text segment herein may refer to any text segment in the text information. The first target video segment and the first target speech segment both correspond to the first target text segment.

Figure 5:
FIG. 5 is a schematic diagram of an interface for displaying multimedia data in embodiments of the disclosure.

Refer to FIG. 5, which is a schematic diagram of an interface for displaying multimedia data in embodiments of the disclosure. The first multimedia data comprise a plurality of first multimedia segments, each multimedia segment corresponding to different text segments, video images, and reading speeches. As illustrated in the figure, two multimedia segments are displayed in the middle of the interface, and in the uppermost part of the interface, the former of the two multimedia media segments is zoomed-in. The two multimedia segments correspond to different video images and of course also correspond to different text segments and reading speeches. In this way, the user may intuitively view the correspondence relationships between the text segments, video images, and reading speeches, and modify one or more multimedia segments thereof dependent on needs, thereby enhancing efficiency of multimedia data generation.

With the multimedia data generating method according to embodiments of the disclosure, after the user inputs the text information, the user may be provided with a recording entry, via which the user may execute the recording trigger operation. In response to the recording trigger operation, text information may be displayed for the user to read, and a first reading speech may be acquired while the user is reading the text information. The first multimedia data may be generated based on the text information and the first reading speech and then displayed. The first multimedia data comprise the first reading speech and a video image matched with the text information; the first multimedia data comprise first multimedia segments corresponding to the plurality of text segments in the text information, respectively. The disclosure may record the first reading speech manually; compared with the speech converted by machine from the text information, the manually recorded first reading speech is more emotional, so that the generated first multimedia data has a higher quality with a better user viewing experience. Moreover, the first multimedia data are displayed with a plurality of first multimedia segments, so that the user may intuitively know the correspondence relationship between the text segment and the video image in the first multimedia segment, which enables modification to individual multimedia segments, thereby enhancing video making efficiency and user experience.

Figure 6:
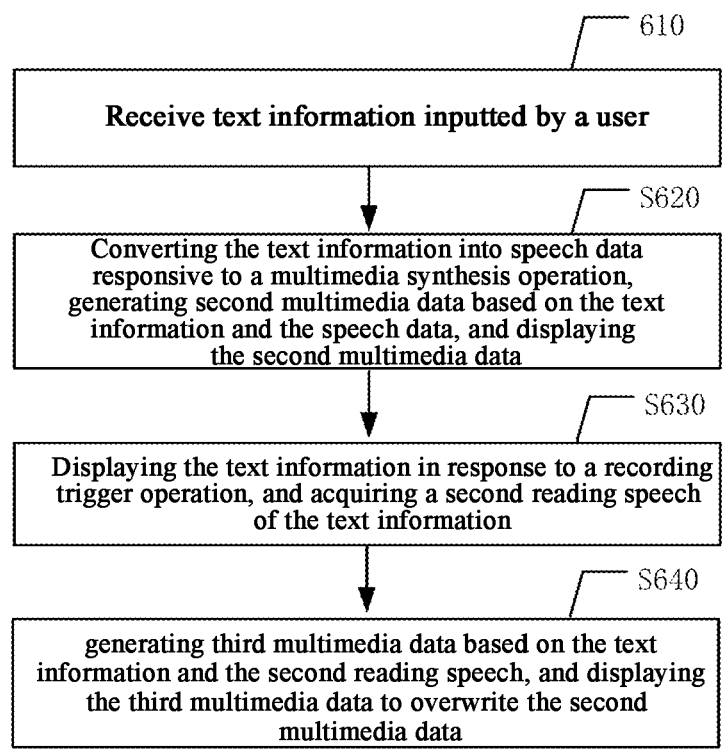
FIG. 6 is another flow diagram of a multimedia data generating method in embodiments of the disclosure.

Refer to FIG. 6, which is another flow diagram of a multimedia data generating method in embodiments of the disclosure, which may comprise steps of:

Step S610: receiving text information inputted by a user.

This step is identical to step S210 in the embodiment of FIG. 2, the details of which may refer to the description in the embodiment of FIG. 2 and are thus omitted here.

Step S620: converting the text information into speech data in response to a multimedia synthesis operation, generating second multimedia data based on the text information and the speech data, and displaying the second multimedia data.

In addition to supporting autonomous recording of the user, the disclosure further supports automatic dubbing, i.e., also providing an entry of automatic dubbing. For example, the one-click video generation button as illustrated in FIG. 3 is the entry for automatic dubbing. By clicking the one-click video generation button, the user executes the multimedia synthesis operation, whereby the multimedia data may be one-click generated. For example, the application may send the text information to the server, and the server converts the text information to speech data using a text-to-speech technique. Likewise, a video image matched with the text information is obtained, and by synthesizing the video data and the speech data, second multimedia data may be derived. The second multimedia data is sent to the application and displayed in the application. It may be seen that the method is simple to operate with a higher efficiency in multimedia data generation.

Similar to the first multimedia data, the second multimedia data may also comprise speech data and a video image matched with the text information. The second multimedia data comprise a plurality of second multimedia segments, the plurality of second multimedia segments respectively corresponding to a plurality of text segments included in the text information. A second target multimedia segment comprises a second target video segment and a second target speech segment, the second target multimedia segment referring to a second multimedia segment in the plurality of second multimedia segments corresponding to a second target text segment in the plurality of text segments, the second target video segment including a video image matched with the second target text segment, the second target speech segment including a reading speech of the second target text segment.

Step S630: displaying the text information in response to a recording trigger operation, and acquiring a second reading speech of the text information.

It is noted that if the user is satisfied with the second multimedia data, he/she may save the second multimedia data to the local terminal device or share it to a social platform. If the user is unsatisfied with the second multimedia data, he/she may perform autonomous recording, whereby quality of the multimedia data is enhanced.

The interface where the second multimedia data is displayed may include an auto record button; the auto record button here has the same function as the auto record button in the embodiment of FIG. 2; the user may execute a recording trigger operation by clicking the auto record button.

As illustrated in FIG. 5, the user may click a play button to play the second multimedia data. The user may also click the auto record button to perform autonomous recording; upon clicking the auto record button to execute the recording trigger operation, a confirm window "autonomous recording is on, existing synthesized speech will be overwritten, continue recording or not?" may be first popped up. If the user clicks continue, the second reading speech is then acquired. Since the loudness, tone, and timber of the same user will differ each time of reading the same text information, the second reading speech acquired in this step is likely different from the first reading speech as noted supra.

Step S640: generating third multimedia data based on the text information and the second reading speech, and displaying the third multimedia data to overwrite the second multimedia data.

The third multimedia data comprise the second reading speech and a video image matched with the text information. The third multimedia data comprise a plurality of third multimedia segments, the plurality of third multimedia segments corresponding to a plurality of text segments included in the text information, respectively. A third target multimedia segment includes a third target video segment and a third target speech segment. The third target multimedia segment refers to a third multimedia segment in the plurality of third multimedia segments corresponding to a third target segment in the plurality of text segments, the third target video segment includes a video image matched with the third target text segment, and the third target speech segment includes a reading speech of the third target text segment.

It is to be noted that, the methods of generating the second multimedia data and the third multimedia data are identical to the method of generating the first multimedia data in the embodiment of FIG. 2, details of which refer to the description in the embodiment of FIG. 2 and are thus omitted here. Since the third multimedia data is generated by autonomous recording on the basis of the second multimedia data, the one-click generated second multimedia data is overwritten by the third multimedia data.

In addition to directly performing autonomous recording to generate the first multimedia data, the disclosure may also perform autonomous recording after one-click generating the second multimedia data. By updating the second multimedia data to the autonomously recorded third multimedia data, the third multimedia data is more emotional, whereby quality of the multimedia data is improved.

Figure 7:
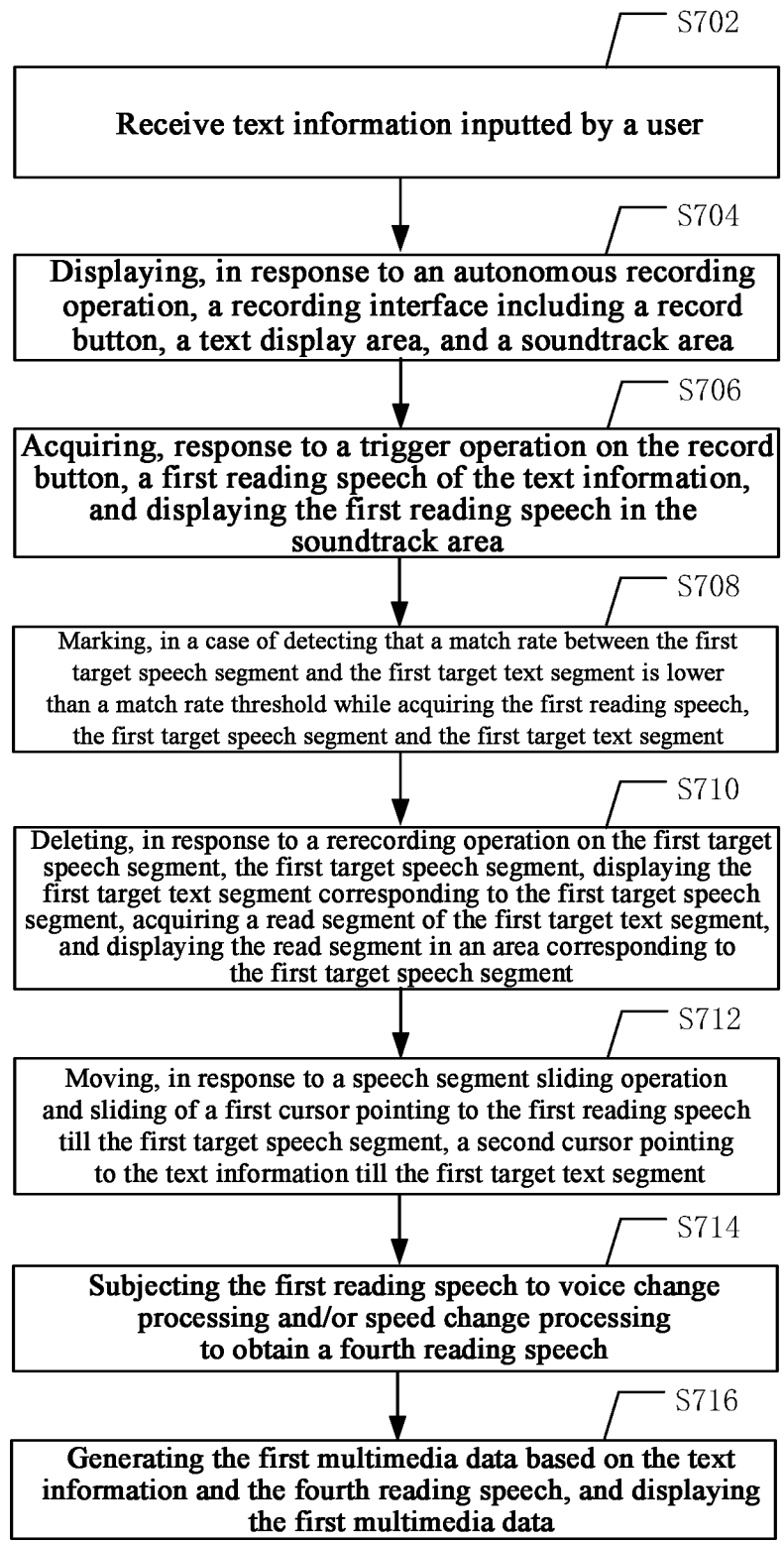
FIG. 7 is a further flow diagram of a multimedia data generating method in embodiments of the disclosure.

Refer to FIG. 7, which is a further flow diagram of a multimedia data generating method in embodiments of the disclosure; the multimedia data generating method may comprise steps of:

Step S702: receiving text information inputted by a user.

This step is identical to step S210 in the embodiment of FIG. 2, the details of which refer to the description in the embodiment of FIG. 2 and are thus omitted here.

Step S704: displaying, in response to an autonomous recording operation, a recording interface including a record button, a text display area, and a soundtrack area.

In embodiments of the disclosure, the text information may be split into a plurality of text segments, each text segment being displayed in a single line, and in a case of exceeding one line, displayed by wrapping, so that the text information is segmentally displayed in the text display area. During the splitting process, the splitting progress may be shown in a popup window, e.g., "text being processed, XX % completed." In this way, during the recording process, the user may view the text information more conveniently and intuitively, thereby avoiding mistaken reading. The recording interface may further include a soundtrack area, the soundtrack area being configured to display a reading speech having been recorded by the user.

Step S706: acquiring, response to a trigger operation on the record button, a first reading speech of the text information, and displaying the first reading speech in the soundtrack area.

As noted supra, the text information in the text display area may be segmentally displayed according to respective text segments. The user may read sequentially according to the order of respective text segments, and upon completion of each reading of one text segment, the corresponding reading speech may be displayed in the soundtrack area. Optionally, the text segment the user is currently reading may be displayed prominently while acquiring the first reading speech. For example, the text segment the user is currently reading may be highlighted; upon detecting completion of reading of the current text segment, the currently read text segment may be scrolled upward without being prominently displayed. During the entire recording process, the currently read text segment may also be kept at the upper portion of the text display area to facilitate the user to read. For example, if the text display area is divided into 4 areas from top to bottom, the currently read text segment may be kept in the first area or the second area.

Figure 8:
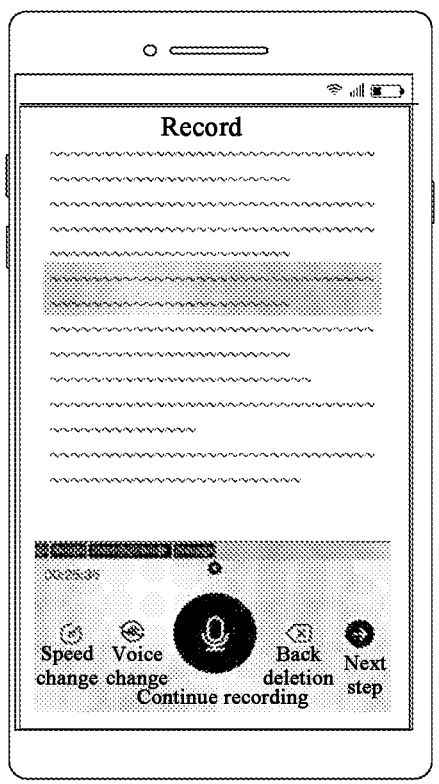
FIG. 8 is another schematic diagram of a recording interface in embodiments of the disclosure.

Refer to FIG. 8, which is another schematic diagram of a recording interface in embodiments of the disclosure. As illustrated in the figure, the text information is segmentally displayed according to the plurality of different text segments, so as to be more convenient and intuitive for the user to read. The currently read text segment may be displayed prominently. Upon completion of the reading, the recording interface may be scrolled up to prominently display the next unread text segment. The soundtrack area lies between the text display area and the record button, a plurality of different reading speeches being displayed in the soundtrack area.

The soundtrack area may include a play button, which is displayed when a reading speech is present but unplayed. Moreover, the play button may be displayed at a tail position of the reading speech pointed to by a cursor. By clicking the play button, the reading speech pointed to by the cursor starts playing. During playing, the text information in the text display area may scroll with the playing progress.

During the recording process, if crash occurs, the recorded audio may be saved, and when accessing the recording interface again, a popup window reading "you have unfinished recording, whether to continue? Yes/No" may be displayed. If the user selects continue, the reading speech before crack is loaded and the recording process continues. If the user selects cancel, the reading speech before crash is abandoned. If no voice is detected during the recording process, it may be alerted in a toast "detect no voice, please check the speaker or read louder" and the like.

Step 708: marking, in a case of detecting that a match rate between the first target speech segment and the first target text segment is lower than a match rate threshold while acquiring the first reading speech, the first target speech segment and the first target text segment.

While the user is reading, correctness of the user's reading may also be detected. If it is detected that the match rate of the acquired first target speech segment and the corresponding first target text segment is lower than a match rate threshold (e.g., 85%, 90%, etc.), the first target speech segment and the first target text segment are marked. For example, the first target text segment is underlined, so that when the user clicks the first target text segment, a bubble alert reading "this segment of text is not matched with the recording" is displayed. Meanwhile, the first target speech segment may be displayed in dark red or the like. The first target text segment herein refers to any text segment in the text information, and the first target speech segment refers to the reading speech of the first target text segment.

Figure 9:
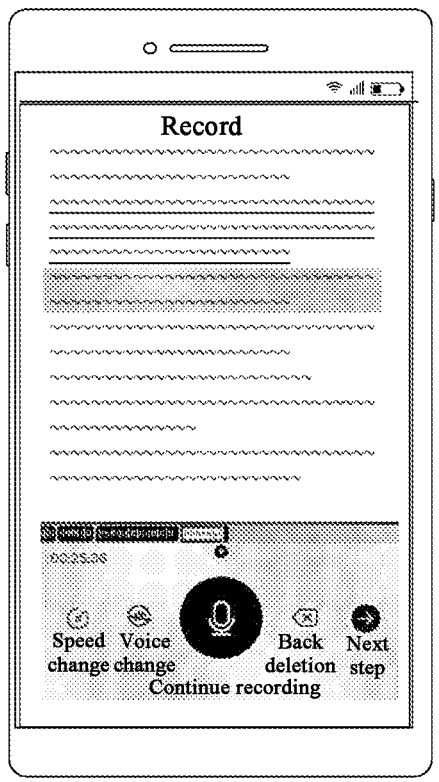
FIG. 9 is a further schematic diagram of a recording interface in embodiments of the disclosure.

Refer to FIG. 9, which is a further schematic diagram of a recording interface in embodiments of the disclosure. As illustrated in the figure, a text segment with mistaken reading by the user is underlined, while the reading speech corresponding to the text segment is displayed with a white background color; those correctly reading speeches are displayed with a black background color. In this way, the user may intuitively know the mistakenly read text segment for rerecording.

Step S710: deleting, in response to a rerecording operation on the first target speech segment, the first target speech segment, displaying the first target text segment corresponding to the first target speech segment, acquiring a read segment of the first target text segment, and displaying the read segment in an area corresponding to the first target speech segment.

Figure 10:
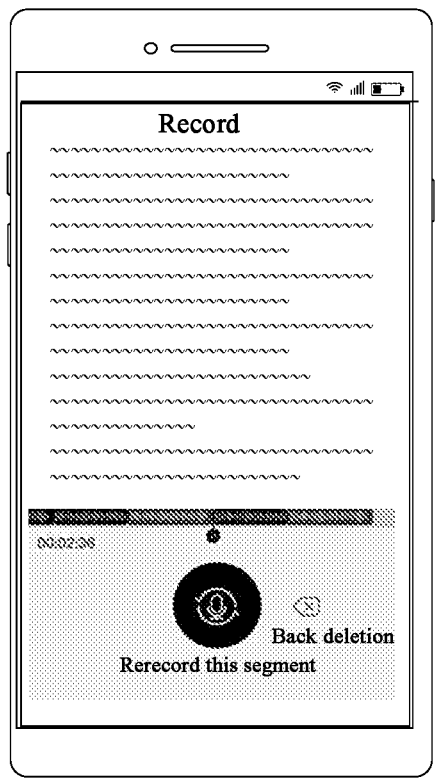
FIG. 10 is a still further schematic diagram of a recording interface in embodiments of the disclosure.

Any reading speech may be rerecorded in a case of being read mistakenly or unsatisfactory to the user. If the cursor points to the middle of the soundtrack area, the record button may be displayed as "rerecord this segment." Refer to FIG. 10, which is a still further schematic diagram of a recording interface in embodiments of the disclosure. The cursor is disposed in the middle of the soundtrack area, pointing to the tail portion of a reading speech. If the user clicks the record button, the reading speech may be deleted, a void is left in the area where the reading speech is located, and then recording starts. When it is detected that the text segment is completely read, the generated read segment is filled in the void, and recording automatically ends.

Step S712: moving, in response to a speech segment sliding operation and sliding of a first cursor pointing to the first reading speech till the first target speech segment, a second cursor pointing to the text information till the first target text segment.

In embodiments of the disclosure, if the reading speech in the soundtrack area is dragged to the left or right, the text information in the text display area also scrolls simultaneously. For example, if the cursor in the soundtrack area is positioned to the first target speech segment, the cursor in the text display area is positioned to the first target text segment corresponding to the first target speech segment.

Step S714: subjecting the first reading speech to voice change processing and/or speed change processing to obtain a fourth reading speech.

In embodiments of the disclosure, after the reading speech is generated, the recording interface may display a voice change button and a speed change button. In a recording suspended state, the reading speech may be subjected to voice change processing via the voice change button, including a plurality of voice change types such as uncle, boy, girl, and Lolita voices. The audio speed may be adjusted via the speed change button, including a plurality of speed change types such as 0.5×, 1×, 1.5×, and 2×, etc., available for the user to select dependent on actual needs. The voice change processing and the speed change processing may be applied to all or part of the reading speeches.

Step S716: generating the first multimedia data based on the text information and the fourth reading speech, and displaying the first multimedia data.

The method of generating the first multimedia data in this step is identical to the method of generating the first multimedia data in the embodiment of FIG. 2, details of which refer to the description in the embodiment of FIG. 2 and are thus omitted here. It is noted that since the fourth reading speech is different from the first reading speech, the first multimedia data generated in this step is also different from the first multimedia data in the embodiment of FIG. 2.

With the multimedia data generating method of the embodiments of the disclosure, the text information in the text display area may be segmentally displayed, so that the user may record according to the order of the text segments; by displaying the reading speech of each text segment in the soundtrack area, the user may play the acquired reading speech in the soundtrack area or rerecord the reading speech in the case of dissatisfaction with the reading speech. During the reading speech acquiring process, correctness of the user's reading may also be detected. In a case that there are more reading mistakes, the mistakenly read text segments and the corresponding reading speeches are marked so as to alert the user. The user may also perform voice change processing and/or speed change processing to the acquired reading speech dependent on actual needs. It is seen that the disclosure provides a convenient, intuitive operating interface for the user, whereby video generation efficiency can be enhanced and user experience can be improved.

Figure 11:
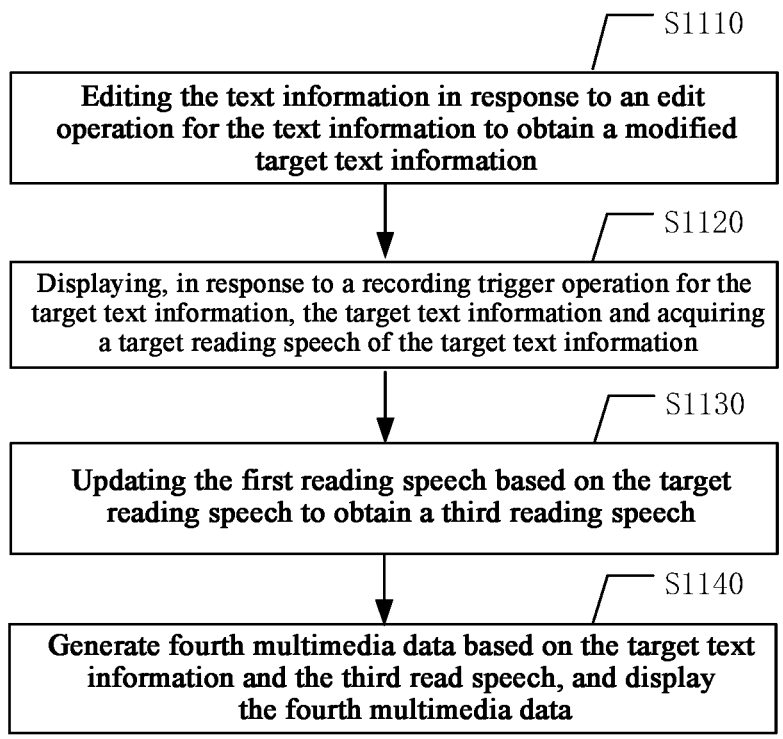
FIG. 11 is a still further flow diagram of a multimedia data generating method in embodiments of the disclosure.

Refer to FIG. 11, which is a still further flow diagram of a multimedia data generating method in embodiments of the disclosure; the method may further comprise the following steps after step S230 based on the embodiment of FIG. 2:

Step S1110: editing the text information in response to an edit operation for the text information to obtain a modified target text information.

After the first multimedia data is generated, the user may modify the text information so as to generate new multimedia data. The interface displaying the first multimedia data may provide an entry for modifying the text information. The interface for displaying the first multimedia data may refer to FIG. 6; the interface may include a text edit button. Upon clicking the text edit button, the text input interface is displayed. The user may modify the displayed text information in the text input interface to obtain target text information, i.e., user-modified text information.

Step S1120: displaying, in response to a recording trigger operation for the target text information, the target text information and acquiring a target reading speech of the target text information.

Upon completion of the user's modification to the text information, a popup window reading "text content has been modified, whether to redub?" may be displayed to alert the user. If the user clicks yes, the recording interface is accessed, and the text segment modified by the user is automatically anchored in the text display area, and the corresponding reading speech is anchored in the soundtrack area. The user may read the text segment modified by the user based on the position anchored in the text display area, and acquire the corresponding reading speech, i.e., the target reading speech. In other words, the user only needs to record the modified text segment, which avoids repeated recording and enhances update efficiency of the multimedia data.

Step S1130: updating the first reading speech based on the target reading speech to obtain a third reading speech.

After the user has finished reading of each modified text segment, the previous reading speech may be automatically deleted and replaced with the re-acquired reading speech at the original position; in this way, the first reading speech is updated to the third reading speech.

Step S1140: generating fourth multimedia data based on the target text information and the third reading speech, and displaying the fourth multimedia data.

The fourth multimedia data comprise the third reading speech and the video image matched with the text information. The fourth multimedia data comprise a plurality of fourth multimedia segments, the plurality of fourth multimedia segments corresponding to a plurality of text segments included in the text information, respectively. A fourth target multimedia segment comprises a fourth target video segment and a fourth target speech segment. The fourth target multimedia segment refers to a fourth multimedia segment in the plurality of fourth multimedia segments corresponding to a fourth target text segment in the plurality of text segments, the fourth target video segment includes the video image matched with the fourth target text segment, and the fourth target speech segment includes the reading speech of the fourth target text segment.

With the multimedia data generating method according to embodiments of the disclosure, after the multimedia data is generated, the user may re-edit the text information in addition to rerecording. After the text information is modified, the user only needs to rerecord the modified text segment and update the first multimedia data with the rerecorded reading speech, finally generating new multimedia data. This may enhance updating efficiency of the multimedia data.

Figure 12:
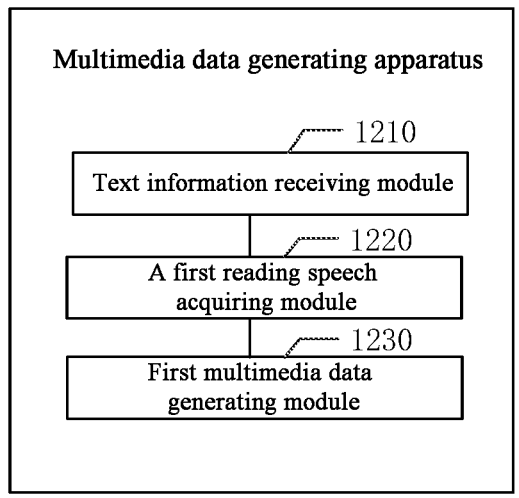
FIG. 12 is a structural schematic diagram of a multimedia data generating apparatus in embodiments of the disclosure.

Corresponding to the method embodiments described supra, embodiments of the disclosure further provide a multimedia data generating apparatus; as illustrated in FIG. 12, a multimedia data generating apparatus 1200 comprises:
  a text information receiving module 1210 configured to receive text information inputted by a user;
  a first reading speech acquiring module 1220 configured to display, in response to a recording trigger operation for the text information, the text information and acquire a first reading speech of the text information;
  a first multimedia data generating module 1230 configured to generate first multimedia data based on the text information and the first reading speech, and display the first multimedia data;
  wherein the first multimedia data comprise the first reading speech and a video image matched with the text information, the first multimedia data comprise a plurality of first multimedia segments, the plurality of first multimedia segments corresponding to a plurality of text segments included in the text information, respectively; wherein a first target multimedia segment comprises a first target video segment and a first target speech segment, the first target multimedia segment referring to a first multimedia segment in the plurality of first multimedia segments corresponding to a first target text segment in the plurality of text segments, the first target video segment including a video image matched with the first target text segment, the first target speech segment including a reading speech of the first target text segment.

Optionally, the multimedia data generating apparatus 1200 further comprises:
  speech data converting module configured to convert the text information into speech data response to a multimedia synthesis operation;
  second multimedia data generating module configured to generate second multimedia data based on the text information and the speech data and display the second multimedia data;
  wherein the second multimedia data comprise speech data and a video image matched with the text information; the second multimedia data comprise a plurality of second multimedia segments, the plurality of second multimedia segments respectively corresponding to a plurality of text segments included in the text information; a second target multimedia segment comprises a second target video segment and a second target speech segment, the second target multimedia segment referring to a second multimedia segment in the plurality of second multimedia segments corresponding to a second target text segment in the plurality of text segments, the second target video segment including a video image matched with the second target text segment, the second target speech segment including a reading speech of the second target text segment.

Optionally, the multimedia data generating apparatus 1200 further comprises:
  a second reading speech acquiring module configured to display, in response to a recording trigger operation after the second multimedia data are generated, the text information, and acquire a second reading speech of the text information;
  a third multimedia data generating module configured to generate a third multimedia data based on the text information and the second reading speech, and display the third multimedia data to overwrite the second multimedia data;
  wherein the third multimedia data comprise the second reading speech and a video image matched with the text information; the third multimedia data comprise a plurality of third multimedia segments, the plurality of third multimedia segments corresponding to a plurality of text segments included in the text information, respectively; a third target multimedia segment includes a third target video segment and a third target speech segment, the third target multimedia segment referring to a third multimedia segment in the plurality of third multimedia segments corresponding to a third target segment in the plurality of text segments, the third target video segment including a video image matched with the third target text segment, and the third target speech segment including a reading speech of the third target text segment.

Optionally, the multimedia data generating apparatus 1200 further comprises:
  a speech segment rerecording module configured to delete, in response to a rerecording operation on the first target speech segment, the first target speech segment, display the first target text segment corresponding to the first target speech segment, acquire a read segment of the first target text segment, and display the read segment in an area corresponding to the first target speech segment.

Optionally, the multimedia data generating apparatus 1200 further comprises:
  a mistake marking module configured to mark, in a case of detecting that a match rate between the first target speech segment and the first target text segment is lower than a match rate threshold while acquiring the first reading speech, the first target speech segment and the first target text segment.

Optionally, the multimedia data generating apparatus 1200 further comprises:
a speech segment sliding module configured to move, in response to a speech segment sliding operation and sliding of a first cursor pointing to the first reading speech till the first target speech segment, a second cursor pointing to the text information till the first target text segment.

Optionally, the multimedia data generating apparatus 1200 further comprises:
a text segment prominently-displaying module configured to prominently display a currently read text segment while acquiring a first reading speech.

Optionally, the multimedia data generating module 1200 further comprises:
a text information modifying module configured to edit, after the first multimedia data are generated and displayed, the text information in response to an edit operation for the text information to obtain a modified target text information;
a target reading speech acquiring module configured to display, in response to a recording trigger operation on the target text information, the target text information and acquire a target reading speech of the target text information.
a third reading speech generating module configured to update the first reading speech based on the target reading speech to obtain a third reading speech;
a fourth multimedia data generating module configured to generate a fourth multimedia data based on the target text information and the third reading speech, and display the fourth multimedia data;
the fourth multimedia data comprise the third reading speech and the video image matched with the text information; the fourth multimedia data comprise a plurality of fourth multimedia segments, the plurality of fourth multimedia segments corresponding to a plurality of text segments included in the text information, respectively; a fourth target multimedia segment comprises a fourth target video segment and a fourth target speech segment, the fourth target multimedia segment referring to a fourth multimedia segment in the plurality of fourth multimedia segments corresponding to a fourth target text segment in the plurality of text segments, the fourth target video segment including the video image matched with the fourth target text segment, the fourth target speech segment including the reading speech of the fourth target text segment.

Optionally, the multimedia data generating apparatus 1200 further comprises:
a speech processing module configured to subject, after the first reading speech is acquired, the first reading speech to voice change processing and/or speed change processing to obtain a fourth reading speech;
a first multimedia data generating module configured to generate the first multimedia data based on the text information and the fourth reading speech, and display the first multimedia data.

Specific details of respective modules or units of the apparatus have been elaborated in the corresponding method and are thus omitted here.

It is noted that although a plurality of modules or units of the apparatus for performing actions have been referred to in the detailed description above, such partitions are not compulsory. In actuality, according to embodiments of the disclosure, the features and functions of two or more modules or units described supra may be embodied in one module or unit. Conversely, the feature and function of one individual module or unit described supra may be further split into more modules or units to embody.

In an example embodiment of the disclosure, there is further provided an electronic device, comprising: a processor; a memory for storing a processor-executable instruction, wherein the processor is configured to perform the multimedia data generating method in this example embodiment.

Figure 13:
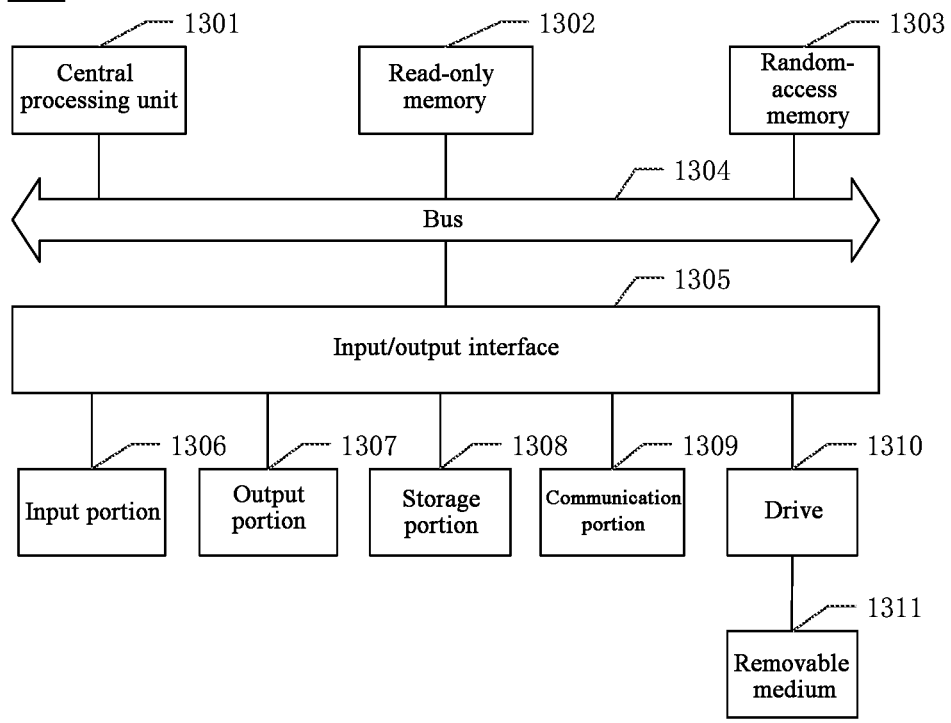
FIG. 13 is a structural schematic diagram of an electronic device in embodiments of the disclosure.

FIG. 13 illustrates a structural schematic diagram of an electronic device according to embodiments of the disclosure. It is noted that the electronic device 1300 illustrated in FIG. 13 is only an example, constituting no limitation to the functions and scope of use of the embodiments of the disclosure.

As illustrated in FIG. 13, the electronic device 1300 comprises a processing device (CPU) 1301, which may execute various suitable actions and processing based on the program stored in a read-only memory (ROM) 1302 or a program loaded in the random-access memory (RAM) 1303 from a storage portion 1308. The RAM 1303 also stores all kinds of programs and data necessary to system operation. The CPU 1301, ROM 1302 and RAM 1303 are interconnected to each other via a bus 1304. The input/output (I/O) interface 1305 is also connected to the bus 1304.

The following devices may be connected to the I/O interface 1305: an input portion 1306 including, e.g., a keypad, and a mouse; an output portion 1307, e.g., a cathode ray tube (CRT), an LCD (Liquid Crystal Display), or a loudspeaker; a storage portion 1308 including a hard disk; and a communication portion 1309 including a network interface card such as a local area network (LAN) card or a modem. The communication portion 1309 performs communication processing via such as the Internet. The drive 1310 is also connected to the I/O interface 1305 as needed. A removable medium 1311, such as a magnetic disc, an optical disc, a magnetooptical disc, a semiconductor memory, is assembled on the drive 1310 as needed so as to install a computer program read therefrom into the storage portion 1308 as needed.

Particularly, according to embodiments of the disclosure, the processes described with reference to the flow diagrams may be implemented as a computer software program. For example, embodiments of the disclosure include a computer program carried on a computer-readable medium, the computer program including program code for executing the methods illustrated in the flow diagrams. In such an embodiment, the computer program may be downloaded and installed from the network via the communication portion 1309, and/or installed from the removable medium 1311. The computer program, when being executed by the central processing unit 1301, performs various functions limited in the apparatus of the disclosure.

In embodiments of the disclosure, there is further provided a computer-readable storage medium on which a computer program is stored, the computer program, when being executed by a processor, implementing the multimedia data generating method provided by the embodiments above.

It is noted that the computer-readable medium described herein may be, but is not limited to, electric, magnetic, optical, electro-magnetic, infrared or semiconductor system, apparatus or device, or any combination thereof. More specific examples of the computer-readable storage medium include, but are not limited to, an electric connection via one or more wires, a portable computer magnetic disk, hard disk, random access memory (RAM), read-only memory (ROM), erasable programmable read-only memory (EPROM or flash memory), optical fiber, portable compact-disc read-only memory (CD-ROM), optical storage device, magnetic storage device, or any appropriate combination thereof. In the disclosure, the computer-readable storage medium may refer to any tangible medium including or storing a program that can be used by an instruction executing system, apparatus or device or used by a combination thereof. The program code stored on the computer-readable medium may be transmitted via any appropriate medium including, but is not limited to, wireless, wire, cable, RF (Radio Frequency), etc., or any appropriate combination thereof.

In embodiments of the disclosure, there is further provided a computer program product which, when running on a computer, causes the computer to perform the multimedia data generating method.

It is noted that relational terms such as "first" and "second" referred to herein are only intended for distinguishing one entity or action from another entity or action, not necessarily requiring or implying that any such actual relationship or sequence is present between these entities or actions. Moreover, the terms "comprise," "include," or any other variants intend for a non-exclusive inclusion, so that a process, method, article or device comprising a series of elements not only includes these elements, but also include non-specified other elements, or further includes elements inherent in this process, method, article or apparatus. Without more limitations, an element limited in a statement "comprising a/an . . . " does not exclude existence of further identical elements in the process, method, article or apparatus including the element.

What have been described are only example embodiments for those skilled in the art to understand the disclosure. Various modifications to these embodiments would be obvious to those skilled in the art. A general principle defined herein may be implemented in other embodiments without departing from the spirit or scope of the disclosure. Therefore, the disclosure would not be limited to the embodiments described herein, but would comply with a broadest scope agreeing with the principle and novel features disclosed herein.

I claim:

1. A multimedia data generating method, comprising:
receiving text information inputted by a user;
displaying, in response to a recording trigger operation for the text information, the text information and acquiring a first reading speech of the text information;
generating a first multimedia data based on the text information and the first reading speech and displaying the first multimedia data; and
marking, in a case of detecting that a match rate between a first target speech segment and a first target text segment is lower than a match rate threshold while acquiring the first reading speech, the first target speech segment, and the first target text segment,
wherein the first multimedia data comprise the first reading speech and a video image matched with the text information, the first multimedia data comprise a plurality of first multimedia segments, the plurality of first multimedia segments corresponding to a plurality of text segments included in the text information, respectively; wherein a first target multimedia segment comprises a first target video segment and the first target speech segment, the first target multimedia segment referring to a first multimedia segment in the plurality of first multimedia segments corresponding to the first target text segment in the plurality of text segments, the first target video segment including a video image matched with the first target text segment, the first target speech segment including a reading speech of the first target text segment.

2. The method of claim 1, further comprising:
converting the text information into speech data in response to a multimedia synthesis operation; and
generating second multimedia data based on the text information and the speech data, and displaying the second multimedia data;
wherein the second multimedia data comprise the speech data and the video image matched with the text information; the second multimedia data comprise a plurality of second multimedia segments, the plurality of second multimedia segments corresponding to a plurality of text segments included in the text information, respectively; a second target multimedia segment comprises a second target video segment and a second target speech segment, the second target multimedia segment referring to a second multimedia segment in the plurality of second multimedia segments corresponding to a second target text segment in the plurality of text segments, the second target video segment including a video image matched with the second target text segment, the second target speech segment including a reading speech of the second target text segment.

3. The method of claim 2, further comprising:
displaying, in response to a recording trigger operation after the second multimedia data are generated, the text information, and acquiring a second reading speech of the text information; and
generating a third multimedia data based on the text information and the second reading speech, and displaying the third multimedia data to overwrite the second multimedia data;
wherein the third multimedia data comprise the second reading speech and the video image matched with the text information; the third multimedia data comprise a plurality of third multimedia segments, the plurality of third multimedia segments corresponding to a plurality of text segments included in the text information, respectively; a third target multimedia segment includes a third target video segment and a third target speech segment, the third target multimedia segment referring to a third multimedia segment in the plurality of third multimedia segments corresponding to a third target segment in the plurality of text segments, the third target video segment including a video image matched with the third target text segment, and the third target speech segment including a reading speech of the third target text segment.

4. The method of claim 1, further comprising:
deleting, in response to a rerecording operation on the first target speech segment, the first target speech segment;
displaying the first target text segment corresponding to the first target speech segment, and acquiring a read segment of the first target text segment; and
displaying the read segment in an area corresponding to the first target speech segment.

5. The method of claim 1, further comprising:
moving, in response to a speech segment sliding operation and sliding of a first cursor pointing to the first reading speech till the first target speech segment, a second cursor pointing to the text information till the first target text segment.

6. The method of claim 1, further comprising:
prominently displaying a text segment currently read by the user while acquiring the first reading speech.

7. The method of claim 1, further comprising:
editing, after the first multimedia data are generated and displayed, the text information in response to an edit operation for the text information to obtain a modified target text information;
displaying, in response to a recording trigger operation for the target text information, the target text information and acquiring a target reading speech of the target text information;
updating the first reading speech based on the target reading speech to obtain a third reading speech; and
generating a fourth multimedia data based on the target text information and the third reading speech, and displaying the fourth multimedia data;
wherein the fourth multimedia data comprise the third reading speech and the video image matched with the text information; the fourth multimedia data comprise a plurality of fourth multimedia segments, the plurality of fourth multimedia segments corresponding to a plurality of text segments included in the text information, respectively; a fourth target multimedia segment comprises a fourth target video segment and a fourth target speech segment, the fourth target multimedia segment referring to a fourth multimedia segment in the plurality of fourth multimedia segments corresponding to a fourth target text segment in the plurality of text segments, the fourth target video segment including the video image matched with the fourth target text segment, the fourth target speech segment including the reading speech of the fourth target text segment.

8. The method of claim 1, further comprising:
subjecting, after the first reading speech is acquired, the first reading speech to voice change processing and/or speed change processing to obtain a fourth reading speech;
wherein the generating a first multimedia data based on the text information and the first reading speech and displaying the first multimedia data comprises:
generating the first multimedia data based on the text information and the fourth reading speech, and displaying the first multimedia data.

9. An electronic device, comprising:
a processor configured to execute a program stored in a memory, wherein the computer program, when being executed by the processor, causes the processer to:
receive text information inputted by a user;
display, in response to a recording trigger operation for the text information, the text information and acquire a first reading speech of the text information;
generate a first multimedia data based on the text information and the first reading speech and display the first multimedia data; and
mark, in a case of detecting that a match rate between a first target speech segment and a first target text segment is lower than a match rate threshold while acquiring the first reading speech, the first target speech segment, and the first target text segment,
wherein the first multimedia data comprise the first reading speech and a video image matched with the text information, the first multimedia data comprise a plurality of first multimedia segments, the plurality of first multimedia segments corresponding to a plurality of text segments included in the text information, respectively; wherein a first target multimedia segment comprises a first target video segment and the first target speech segment, the first target multimedia segment referring to a first multimedia segment in the plurality of first multimedia segments corresponding to the first target text segment in the plurality of text segments, the first target video segment including a video image matched with the first target text segment, the first target speech segment including a reading speech of the first target text segment.

10. The electronic device of claim 9, wherein the processor is further caused to:
convert the text information into speech data in response to a multimedia synthesis operation; and
generate second multimedia data based on the text information and the speech data, and display the second multimedia data;
wherein the second multimedia data comprise the speech data and the video image matched with the text information; the second multimedia data comprise a plurality of second multimedia segments, the plurality of second multimedia segments corresponding to a plurality of text segments included in the text information, respectively; a second target multimedia segment comprises a second target video segment and a second target speech segment, the second target multimedia segment referring to a second multimedia segment in the plurality of second multimedia segments corresponding to a second target text segment in the plurality of text segments, the second target video segment including a video image matched with the second target text segment, the second target speech segment including a reading speech of the second target text segment.

11. The electronic device of claim 10, wherein the processor is further caused to:
display, in response to a recording trigger operation after the second multimedia data are generated, the text information, and acquire a second reading speech of the text information; and
generate a third multimedia data based on the text information and the second reading speech, and display the third multimedia data to overwrite the second multimedia data;
wherein the third multimedia data comprise the second reading speech and the video image matched with the text information; the third multimedia data comprise a plurality of third multimedia segments, the plurality of third multimedia segments corresponding to a plurality of text segments included in the text information, respectively; a third target multimedia segment includes a third target video segment and a third target speech segment, the third target multimedia segment referring to a third multimedia segment in the plurality of third multimedia segments corresponding to a third target segment in the plurality of text segments, the third target video segment including a video image matched with the third target text segment, and the third target speech segment including a reading speech of the third target text segment.

12. The electronic device of claim 9, wherein the processor is further caused to:
delete, in response to a rerecording operation on the first target speech segment, the first target speech segment;

display the first target text segment corresponding to the first target speech segment, and acquire a read segment of the first target text segment; and display the read segment in an area corresponding to the first target speech segment.

13. The electronic device of claim 9, wherein the processor is further caused to:

move, in response to a speech segment sliding operation and sliding of a first cursor pointing to the first reading speech till the first target speech segment, a second cursor pointing to the text information till the first target text segment.

14. The electronic device of claim 9, wherein the processor is further caused to:

prominently display a text segment currently read by the user while acquiring the first reading speech.

15. The electronic device of claim 9, wherein the processor is further caused to:

edit, after the first multimedia data are generated and displayed, the text information in response to an edit operation for the text information to obtain a modified target text information;

display, in response to a recording trigger operation for the target text information, the target text information and acquire a target reading speech of the target text information;

update the first reading speech based on the target reading speech to obtain a third reading speech; and generate a fourth multimedia data based on the target text information and the third reading speech, and display the fourth multimedia data;

wherein the fourth multimedia data comprise the third reading speech and the video image matched with the text information; the fourth multimedia data comprise a plurality of fourth multimedia segments, the plurality of fourth multimedia segments corresponding to a plurality of text segments included in the text information, respectively; a fourth target multimedia segment comprises a fourth target video segment and a fourth target speech segment, the fourth target multimedia segment referring to a fourth multimedia segment in the plurality of fourth multimedia segments corresponding to a fourth target text segment in the plurality of text segments, the fourth target video segment including the video image matched with the fourth target text segment, the fourth target speech segment including the reading speech of the fourth target text segment.

16. The electronic device of claim 9, wherein the processor is further caused to:

subject, after the first reading speech is acquired, the first reading speech to voice change processing and/or speed change processing to obtain a fourth reading speech;

and wherein the processor is further caused to:

generate the first multimedia data based on the text information and the fourth reading speech, and displaying the first multimedia data, so as to generate a first multimedia data based on the text information and the first reading speech and displaying the first multimedia data.

17. A non-transitory computer-readable storage medium on which a computer program is stored, wherein the computer program, when being executed by a processor, causes the processer to:

receive text information inputted by a user;

display, in response to a recording trigger operation for the text information, the text information and acquire a first reading speech of the text information;

generate a first multimedia data based on the text information and the first reading speech and display the first multimedia data; and mark, in a case of detecting that a match rate between a first target speech segment and a first target text segment is lower than a match rate threshold while acquiring the first reading speech, the first target speech segment, and the first target text segment, wherein the first multimedia data comprise the first reading speech and a video image matched with the text information, the first multimedia data comprise a plurality of first multimedia segments, the plurality of first multimedia segments corresponding to a plurality of text segments included in the text information, respectively; wherein a first target multimedia segment comprises a first target video segment and the first target speech segment, the first target multimedia segment referring to a first multimedia segment in the plurality of first multimedia segments corresponding to the first target text segment in the plurality of text segments, the first target video segment including a video image matched with the first target text segment, the first target speech segment including a reading speech of the first target text segment.

18. The non-transitory computer-readable storage medium of claim 17, wherein the processor is further caused to:

convert the text information into speech data in response to a multimedia synthesis operation; and generate second multimedia data based on the text information and the speech data, and display the second multimedia data;

wherein the second multimedia data comprise the speech data and the video image matched with the text information; the second multimedia data comprise a plurality of second multimedia segments, the plurality of second multimedia segments corresponding to a plurality of text segments included in the text information, respectively; a second target multimedia segment comprises a second target video segment and a second target speech segment, the second target multimedia segment referring to a second multimedia segment in the plurality of second multimedia segments corresponding to a second target text segment in the plurality of text segments, the second target video segment including a video image matched with the second target text segment, the second target speech segment including a reading speech of the second target text segment.

* * * * *